(12) United States Patent
Muto

(10) Patent No.: US 11,616,454 B2
(45) Date of Patent: Mar. 28, 2023

(54) POWER CONVERSION DEVICE

(71) Applicant: KYOSAN ELECTRIC MFG. CO., LTD., Yokohama (JP)

(72) Inventor: Kunihiro Muto, Yokohama (JP)

(73) Assignee: KYOSAN ELECTRIC MFG. CO., LTD., Yokohama (JP)

(*) Notice: Subject to any disclaimer, the term of this patent is extended or adjusted under 35 U.S.C. 154(b) by 0 days.

(21) Appl. No.: 17/616,763

(22) PCT Filed: Mar. 18, 2020

(86) PCT No.: PCT/JP2020/011912
§ 371 (c)(1),
(2) Date: Dec. 6, 2021

(87) PCT Pub. No.: WO2020/250531
PCT Pub. Date: Dec. 17, 2020

(65) Prior Publication Data
US 2022/0345053 A1    Oct. 27, 2022

(30) Foreign Application Priority Data
Jun. 10, 2019 (JP) .............................. JP2019-108079

(51) Int. Cl.
*H02M 7/5387* (2007.01)
*H02M 1/00* (2006.01)

(52) U.S. Cl.
CPC ..... *H02M 7/53878* (2021.05); *H02M 1/0043* (2021.05)

(58) Field of Classification Search
CPC ........................ H02M 7/53878; H02M 1/0043
See application file for complete search history.

(56) References Cited

U.S. PATENT DOCUMENTS

2009/0268490 A1* 10/2009 Wagoner ............... H02P 27/08
363/74
2014/0203659 A1    7/2014 Madawala et al.
(Continued)

FOREIGN PATENT DOCUMENTS

JP    2014-521288 A    8/2014
JP    2016-111922 A    6/2016
(Continued)

OTHER PUBLICATIONS

International Search Report dated Jun. 30, 2020, issued in counterpart International application No. PCT/JP2020/011912. (2 pages).
(Continued)

*Primary Examiner* — Jue Zhang
(74) *Attorney, Agent, or Firm* — WHDA, LLP

(57) ABSTRACT

In this power conversion device, a phase deviation of an output voltage due to a phase shift control is eliminated. The power conversion device according to the present invention converts DC voltage to AC voltage by phase-shift controlling the switching elements of a full bridge inverter. In place of a conventional method in which only one of the first and second legs of the full bridge inverter is phase-shifted, both legs are phase-shifted in opposite directions to each other to control an overlap angle at which the switching elements of the first and second legs of the full bridge are simultaneously brought into an on-state. The variation of the center phase of the overlap angle is suppressed by phase-shifting the first and second legs in the opposite directions to each other.

6 Claims, 11 Drawing Sheets

(56) References Cited

U.S. PATENT DOCUMENTS

| | | |
|---|---|---|
| 2017/0063247 A1* | 3/2017 | Kieferndorf ........ H02M 7/5395 |
| 2019/0081571 A1* | 3/2019 | Chung .................. H02M 7/219 |
| 2019/0214916 A1 | 7/2019 | Takahara et al. |
| 2019/0356239 A1 | 11/2019 | Okudera et al. |

FOREIGN PATENT DOCUMENTS

| | | |
|---|---|---|
| WO | 2018/061286 A1 | 4/2018 |
| WO | 2018/139565 A1 | 8/2018 |

OTHER PUBLICATIONS

Extended (Supplementary) European Search Report dated Jan. 9, 2023, issued in counterpart EP application No. 20823583.8. (6 pages).
Schoneman, "500-W Zero-Voltage-Switched Full-Bridge Two-Quadrant Power Modulator", IEEE, 1993, vol. 8, pp. 700-706, cited in EP Extended European Search Report dated Jan. 9, 2023 (8 pages).

\* cited by examiner

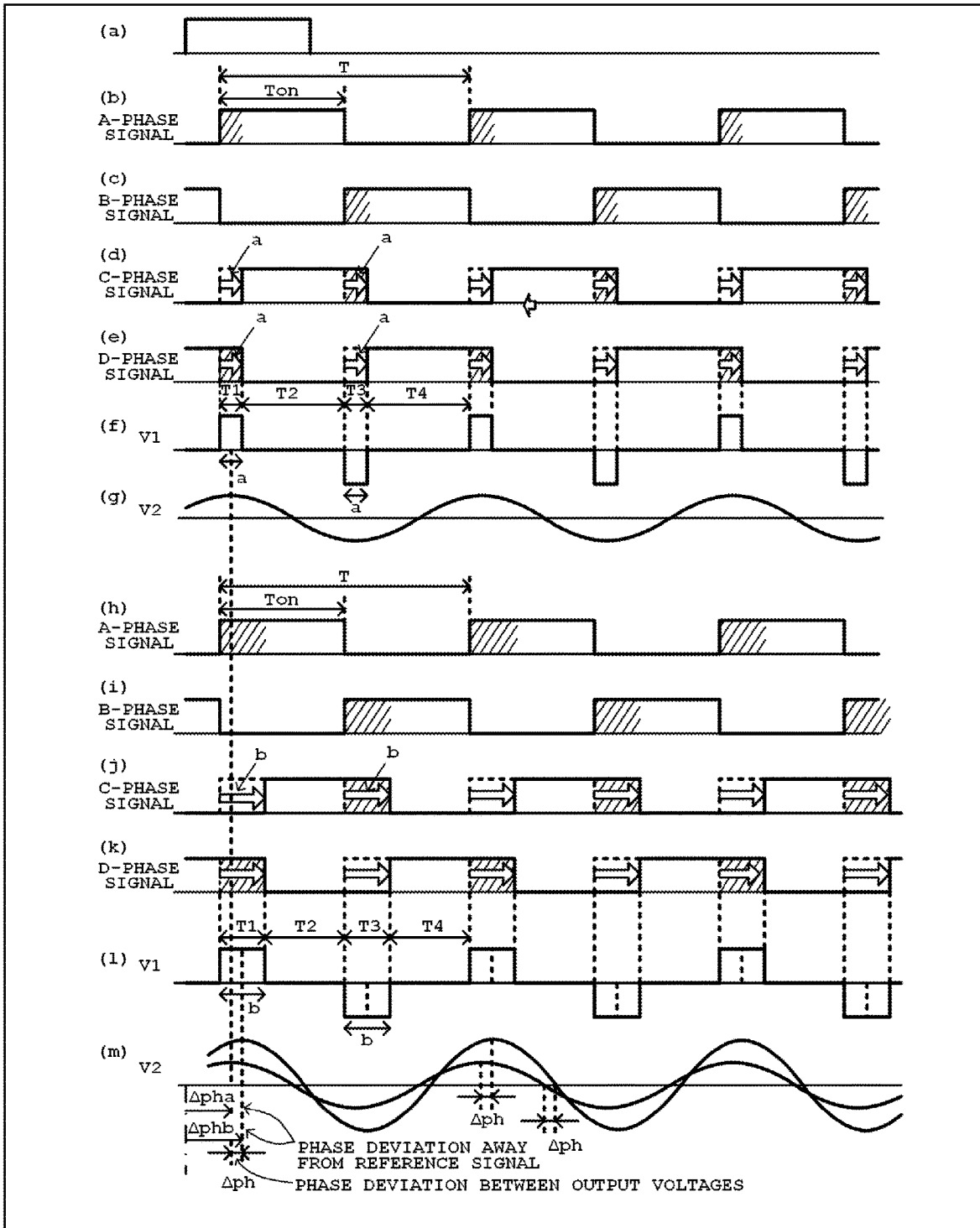

POWER CONVERSION DEVICE

TECHNICAL FIELD

The present invention relates to a power conversion device that converts a DC voltage into an AC voltage.

BACKGROUND ART

There is a known inverter or DC/DC converter of phase-shifted bridge type (see Patent Literatures 1, 2). A full bridge inverter comprises a circuit that is configured with a full bridge consisting of a pair of legs connected in parallel to each other, with respective two switching elements being connected in series, in which each of arms of the parallel-connected first and second legs has its both ends used as input terminals connected to a positive voltage and a negative voltage of a DC power source, and each of the arms of the first leg and the second leg has its connection point used as an output terminal. The full bridge inverter converts a DC voltage fed to the input terminal into an AC voltage and in turn outputs the AC voltage from the output terminal. The DC/DC converter has similar circuitry that enables to convert a DC voltage into another DC voltage to thereby output the converted voltage from the output terminal.

There is known phase shift control for controlling electric power of the full bridge inverter.

The phase shift control controls an output voltage by adjusting an overlap angle between the first leg and the second leg of the full bridge to thereby make power conversion.

FIG. 10 shows a schematic configuration of a full bridge type switching circuit.

A full bridge switching circuit 103 consists of four switching elements QA, QB, QC and QD. The switching elements QA and QB form a first leg 103a, and the switching elements QC and QD form a second leg 103b.

The first leg 103a is formed by DC connection between the switching elements QA and QB, and the second leg 103b is formed by DC connection between the switching elements QC and QD. One of terminals of the switching element QA and the switching element QC are connected with a positive electrode of a DC power source 102, and the other of terminals of the switching element QB and the switching element QD are connected with a negative electrode of the DC power source 102. Output terminals of the full bridge switching circuit 103 are formed by a connection point between the switching element QA and the switching element QB of the first leg 103a and a connection point between the switching element QC and the switching element QD of the second leg 103b.

The full bridge switching circuit 103 carries out a DC-AC conversion on a DC voltage by an ON/OFF operation of four switching elements QA, QB, QC and QD, thereby outputting a converted rectangular wave AC output voltage V1 from the output terminal. The output voltage V1 is sent via a transformer 107 to a filter circuit 108. The filter circuit 108 is for smoothing the rectangular wave AC into a sine wave AC, so as to output an output voltage V2.

In conventional manner, a switching circuit of the phase-shifted bridge type uses either one of a first leg or a second leg as fixed leg on which phase shift is not performed while using the other leg as shift leg on which the phase shift is performed, in order to perform power control. A phase of a drive signal for driving each switching element of the fixed leg is fixed, whereas a phase of another drive signal for driving the switching elements of the shift leg is phase shifted.

The phases of the drive signals for driving the switching elements of both legs are relatively shifted, so that switching elements of an upper arm of one of the legs and a lower arm of the other leg are simultaneously brought into an ON state in a cycle to allow a current to flow from the output terminal in one direction, and then the concerned switching elements are changed to different switching elements to be turned ON in the next cycle, so that switching elements of a lower arm of one of the legs and an upper arm of the other leg are simultaneously brought into the ON state to allow the current to flow from the output terminal in a direction opposite to the direction in the previous cycle. In this relative phase shift, an amount of phase shift is controlled to adjust an overlap angle at which the switching element of the first leg and the switching element of the second leg are brought into the ON state simultaneously, thereby controlling the output voltage. Increase in the overlap angle boosts the output voltage.

FIG. 11 shows an example of a signal waveform in a conventional phase-shifted full bridge comprising a fixed leg and a shift leg. The example in this figure shows that a first leg consisting of a switching element QA and a switching element QB is the fixed leg, and a second leg consisting of a switching element QC and a switching element QD is the shift leg. Furthermore, FIGS. 11(a) to 11(g) show examples of the phase shift by an amount of phase shift a, and FIGS. 11(h) to 11(m) show example of the phase shift by an amount of phase shift b.

In addition to that FIG. 11(a) shows a reference signal, FIGS. 11(b), 11(c) and FIGS. 11(h), 11(i) show an A-phase signal and a B-phase signal for driving the switching elements QA and QB of the first leg, respectively, FIGS. 11(d), 11(e) and FIGS. 11(j), 11(k) show a C-phase signal and a D-phase signal for driving the switching elements QC and QD of the second leg, respectively, FIGS. 11(f) and 11(l) show an output voltage V1 of a switching circuit, and FIGS. 11(g) and 11(m) show an output voltage V2 of a filter circuit.

In a bridge circuit of a full bridge inverter, each of an A-phase signal, a B-phase signal, a C-phase signal and a D-phase signal for driving switching elements of legs has a certain phase difference with respect to a reference signal, and the phase signals have the same cycle, in which a duty ratio between an ON signal and an OFF signal is 50%, including a dead time.

The phases of the A-phase signal and the B-phase signal of the first leg are opposite to each other, and the phases of the C-phase signal and the D-phase signal of the second leg are opposite to each other. Before the phase shift, the A-phase signal and the C-phase signal are in phase, and the B-phase signal and the D-phase signal are in phase. After the phase shift, a phase difference occurs between the C-phase signal and the D-phase signal of the second leg and the A-phase signal and the B-phase signal of the first leg by an amount of phase shift (an amount of phase shift a or an amount of phase shift b).

A description will now be made about examples of the phase shift by the amount of phase shift a by referring to FIGS. 11(b) to 11(g). The A-phase signal and the B-phase signal respectively of FIGS. 11(b) and 11(c) are fixed without being phase shifted. The C-phase signal and the D-phase signal respectively of FIGS. 11(d) and 11(e) are phase shifted by the amount of phase shift a.

In a state before the phase shift, since the phases of the A-phase signal and B-phase signal of the fixed leg as well as the phases of the D-phase signal and C-phase signal of the shift leg are opposite to each other, there is no period during which the phase signals overlap one another. Consequently, a current does not flow through the switching circuit, and thus no output is obtained.

The phase shift is for shifting only the C-phase signal and the D-phase signal of the second leg by the same amount of phase shift a in the same time direction. This phase shift produces a period during which the phase signals of the first leg and the second leg overlap one another in a half cycle, thereby bringing the switching elements into the ON state simultaneously to form a current path between both electrodes of the DC power source via the switching circuit. Then, the switching elements are changed to the other switching elements to be turned ON in the next half cycle, and thereby another current path is formed in the direction opposite to the direction in the previous half cycle.

The A-phase signal of the fixed leg and the D-phase signal of the shift leg overlap each other in a time width T1 that corresponds to the amount of phase shift a, so that the output voltage V1 is generated. Furthermore, the B-phase signal of the fixed leg and the C-phase signal of the shift leg overlap each other in a time width T3 that corresponds to the amount of phase shift a, so that the output voltage V1 with opposite polarity is generated. By contrast, in a time width T2, both of the A-phase signal of the fixed leg and the C-phase signal of the shift leg are in the ON state, whereas both of the B-phase signal of the fixed leg and the D-phase signal of the shift leg are in the OFF state, so that output voltage is not generated. Similarly, in a time width T4, both of the A-phase signal of the fixed leg and the C-phase signal of the shift leg are in the OFF state, whereas both of the B-phase signal of the fixed leg and the D-phase signal of the shift leg are in the ON state, so that no current path is formed and thus the output voltage is not generated.

The output voltage V1 will be, as shown in FIG. 11(f), a rectangular wave AC in a time width corresponding to the amount of phase shift a, of which polarity alternates positive and negative. The output voltage V2 will have, as shown in FIG. 11(g), a sine waveform as the output voltage V1 is smoothed by the filter circuit. FIGS. 11(h) to 11(m) show the examples of the phase shift by the amount of phase shift b which are different from the examples of the phase shift by the amount of phase shift a shown in FIGS. 11(b) to 11(g) only in the amount of phase shift, and thus the description about these examples will be omitted.

CITATION LIST

Patent Literature

[Patent Literature 1] International Publication No. WO 2018/061286
[Patent Literature 2] Japanese Patent Laid-Open Publication No. 2016-111922

SUMMARY OF THE INVENTION

Problems to be Solved by the Invention

In a phase-shifted full bridge system, if one of the legs is used as fixed leg, the other leg is used as shift leg and one of the legs is subjected to the phase shift, a problem arises that a phase deviation occurs. There are two types of the phase deviation, i.e., first phase deviation and second phase deviation.

(First Phase Deviation)

The first phase deviation is deviation in the output voltage with respect to the reference signal. The output voltage is produced by performing the phase shift on the phase signal of the shift leg. In the production of the output voltage by the phase shift, the phase deviation occurs in the phase of the output voltage with respect to the reference signal. This phase deviation is dependent on the amount of phase shift.

In FIG. 11(m), $\Delta$pha denotes an amount of phase deviation in the output voltage V2 with respect to the reference signal when the phase shift is performed by the amount of phase shift a, and $\Delta$phb denotes an amount of phase deviation in the output voltage V2 with respect to the reference signal when the phase shift is performed by the amount of phase shift b. In here, in regard to the phase deviation in a time from a rising edge of the reference signal to a center of the time width of the rectangular wave of the output voltage V1 or a time from the rising edge of the reference signal to a peak of the sine waveform of the output voltage V2, $\Delta$pha represents the amount of phase deviation by the amount of phase shift a, and $\Delta$phb represents the amount of phase deviation by the amount of phase shift b.

The amounts of phase deviation $\Delta$pha, $\Delta$phb depend on the amount of phase shift a and the amount of phase shift b, respectively, and the amount of phase deviation in the output voltage with respect to the reference signal changes according to the change in the amount of phase shift. If a system comprising multiple electric devices is supplied with electric power from a power conversion device, it is necessary to avoid the phase deviation in the electric power supplied to the electric devices in order to synchronize operation timings between the multiple electric devices.

The phase deviation in the output voltage occurring in the power conversion device due to the conventional phase shift control affects the timings between the operations of the electric devices based on the power supplied from the power conversion device and the operations of the electric devices based on the reference signal, and thus the deviation in the operations may occur.

(Second Phase Deviation)

The second phase deviation is that if the amount of phase shift of the phase shift is different, the amount of phase deviation in the output voltage is different. Since the phase deviation depends on the amount of phase shift, the phase deviation occurs in the output voltage when the amount of phase shift is changed to change the output voltage. In FIG. 11(m), there is an amount of deviation of a difference $\Delta$ph between the amount of phase deviation $\Delta$pha due to the amount of phase shift a and the amount of phase deviation $\Delta$phb due to the amount of phase shift b.

In the system that allows multiple power converters to supply electric power to the multiple electric devices, if the power converters output different output voltages, the phase shift is performed by different amounts of phase shift according to the electric power to be supplied to the electric devices which are power supply targets, causing the occurrence of the phase deviation between the output voltages fed to the electric devices due to the difference in their amounts of phase shift. The phase deviation between the output voltages affects the operation timings of the electric devices, and thus the deviation in the operations may occur.

An object of the present invention is to solve the above-described known drawbacks, and eliminate the phase deviation in the output voltage in the power conversion device caused by the phase shift control.

Means for Solving the Problem

The present invention relates to a power conversion device that performs phase shift control on switching elements of a full bridge inverter to convert a DC voltage into an AC voltage, in which the phase shift control is performed on both of a first leg and a second leg of the full bridge inverter in directions opposite to each other, instead of performing the phase shift only on one of the legs as with a conventional control method, thereby adjusting an overlap angle at which the switching elements of the first leg and the second leg of the full bridge are brought into an ON state simultaneously. By performing the phase shift on the first leg and the second leg in the directions opposite to each other, a phase center at the overlap angle can be prevented from changing. In here, the phase center at the overlap angle means the center of the phase in an interval where the first leg and the second leg overlap each other. The above-described control can eliminate phase deviation away from a reference signal in an output voltage (first phase deviation) and phase deviation between different output voltages (second phase deviation).

The power conversion device of the invention comprises an inverter in a full bridge configuration and a control circuit for controlling the inverter.

The first leg and the second leg included in the inverter form a full bridge, as with a conventional configuration. In regard to the first leg and second leg, each leg has two switching elements connected in series to each other, while both legs are connected in parallel with each other. One end of each of the parallel-connected first leg and second leg is connected to a positive electrode of a DC power source and the other end of each leg is connected to a negative electrode of the DC power source, and furthermore a connection point of an arm of the first leg and a connection point of an arm of the second leg are used as output ends.

(Control Circuit)

The control circuit controls an ON/OFF operation of the switching elements of the first leg and the second leg. The control circuit performs the phase shift on a pair of rectangular wave signals having opposite phases in the same cycle, in directions opposite to each other by the amounts of phase shift. In this context, the phase shift in the opposite directions means the phase shift for advancing the phases and the phase shift for delaying the phases. In addition to that, the pair of rectangular wave signals before performing the phase shift is in a certain phase relationship with the reference signal. Moreover, a duty ratio of the pair of rectangular wave signals with the opposite phases is 50%, including a dead time. The dead time is an OFF interval in which the switching elements are brought into the ON state simultaneously to avoid an occurrence of a short circuit. In the duty ratio including the dead time, a duration of an OFF signal is usually set to be longer than that of an ON signal. For example, the duration of the ON signal is set to 46% and the duration of the OFF signal is set to 54%. This setting is a mere example, and thus is not limited thereto.

A switching element on a positive electrode side and a switching element on a negative electrode side of the first leg are turned ON and OFF with the phases opposite to each other by a pair of phase shift signals having opposite phases which are phase shifted in the same direction. A switching element on a positive electrode side and a switching element on a negative electrode side of the second leg are turned ON and OFF with the phases opposite to each other by a pair of phase shift signals having opposite phases which are phase shifted in a direction opposite to the direction of the phase shift on the first leg.

Based on the amount of phase shift in the phase shift, the control is performed on time widths of a period during which both of the switching element on the positive electrode side of the first leg and the switching element on the negative load side of the second leg are brought into the ON state and a period during which both of the switching element on the negative electrode side of the first leg and the switching element on the positive load side of the second leg are brought into the ON state.

Since an amplitude of the output voltage and output power are dependent on the time widths of the periods during which both of the switching elements on the opposite electrodes of the first leg and the second leg is brought into the ON state, the control circuit controls the amounts of phase shift for the phase shift in the directions opposite to each other in order to control the amplitude of the output voltage and the output power.

When the first leg and the second leg are phase shifted in the directions opposite to each other, the amounts of deviation in the rectangular wave signals caused by the phase shift on the legs cancel each other out. The cancellation of the amounts of deviation in the rectangular wave signals prevents a change of a phase position at the center of an interval where the first leg and the second leg overlap. Consequently, the phase deviation that the phase of the output voltage deviates away from the phase of the reference signal (first phase deviation) is eliminated. In addition to that, the phase deviation between the output voltages is also eliminated, which deviation occurs because the phases of the output voltages obtained by varying the amount of phase shift differ from one another according to the amounts of phase shift (second phase deviation).

(Phase Shift Unit)

The control circuit comprises a phase shift amount generation unit that generates an amount of phase shift on the basis of a voltage command, and a phase shift unit that performs the phase shift on a pair of rectangular wave signals by an amount of phase shift generated by the phase shift amount generation unit.

According to a detailed configuration, the phase shift unit comprises a first phase shift section and a second phase shift section for performing the phase shift on the pair of rectangular wave signals by the amount of phase shift, in order to perform the phase shift on the pair of rectangular wave signals in the directions opposite to each other. The first phase shift section and second phase shift section perform leading-phase shift for advancing the phase of the rectangular wave signal by the amount of phase shift and lagging-phase shift for delaying the phase of the rectangular wave signal by the amount of phase shift, so as to shift the phases in the directions opposite to each other. In this regard, if one cycle of the rectangular wave signal is defined as $2\pi$ and an amount of phase shift $\alpha$ is defined as a shift angle $\alpha$, the amount of the phase shift of the leading-phase shift may be represented as $(\alpha+2\pi)$ which is obtained by adding 2n to the shift angle $\alpha$, and the amount of the phase shift of the lagging-phase shift may be represented as $(\alpha-2\pi)$ which is obtained by subtracting 2n from the shift angle $\alpha$.

The leading-phase shift may also be lagging-phase shift for delaying a phase by an amount of phase shift $(2\pi-\alpha)$ obtained by subtracting the amount of phase shift $\alpha$ from $2\pi$.

(Phase Compensation)

In addition to the above-described phase deviation, the phase shift control may cause different phase deviation that the phase of the output voltage shifts away from the phase of the reference signal due to another factor, such as circuit characteristics. It is conceivable that this phase deviation may remain by the phase shift on the rectangular wave signals in the opposite directions. For such phase deviation in the output voltage, the control circuit may also be provided with constituent elements for eliminating the deviation by phase compensation.

The phase shift unit of the control circuit comprises, as the above-mentioned constitutional elements for the phase compensation, a phase comparing unit for comparing phase differences between the reference signal and the output voltages, and a phase compensation amount calculating unit for calculating an amount of phase compensation to compensate the phases of the output voltages with the phase of the reference signal.

The phase shift unit performs the phase compensation on phases of rectangular wave signals for a pair of the switching elements of the first leg and the second leg, which elements are on the electrode sides opposite to each other, on the basis of the amount of phase compensation obtained by the phase compensation amount calculating unit. Since the phase compensation by the amount of phase compensation compensates the phases of the rectangular wave signals in the same direction, the compensation does not affect the elimination of the phase shifting caused by the phase shift.

(Voltage Compensation)

As phase deviation in the output voltage other than the phase deviation due to the phase shift control, an amplitude of the output voltage may be changed by the voltage command due to a different factor, such as circuit characteristics. The control circuit may also be provided with constituent elements for eliminating the change in the amplitude of the output voltage.

The control circuit comprises, as the constituent elements for eliminating the change in the amplitude of the output voltage, a voltage comparing unit for comparing voltage differences between the voltage command and the output voltages, and a voltage compensation amount calculating unit for calculating an amount of voltage compensation to compensate the output voltage with the voltage command based on the voltage differences.

The phase shift unit compensates the amount of phase shift for the pair of rectangular wave signals for the switching elements of the first leg and the second leg, which elements are on the electrode sides opposite to each other, on the basis of the amount of voltage compensation obtained by the voltage compensation amount calculating unit.

The voltage compensation can have an aspect of compensating both of the first leg and the second leg in the same direction by the same amount of phase shift, or an aspect of compensating two pairs of the switching elements of the first leg and the second leg, which are on the electrode sides opposite to each other, in the same direction by the same amount of phase shift, in the directions opposite to each other. Since the voltage compensation by the amount of voltage compensation compensates the phases of the rectangular wave signals in the same direction, the compensation does not affect the elimination of the phase deviation caused by the phase shift.

Effects of the Invention

As described above, the present invention can eliminate the phase deviation in the output voltage caused by the phase shift control in the power conversion device.

BRIEF DESCRIPTION OF THE DRAWINGS

FIG. 11 shows an example of a signal waveform created by a conventional phase-shifted full bridge type.

BEST MODE FOR CARRYING OUT THE INVENTION

The present invention relates to a power conversion device that performs phase shift control on switching elements of a full bridge inverter to convert a DC voltage into an AC voltage, thereby increasing and decreasing an output voltage by an amount of phase shift, in which device phase shift is performed on two legs provided to the full bridge inverter, namely a first leg and a second leg, in directions opposite to each other.

Conventional phase shift control performs the phase shift on only one of the first leg and second leg of the full bridge inverter. By contrast, the phase shift control of the invention performs the phase shift on both legs, instead of performing the phase shift only on one leg in the conventional method. By performing the phase shift on the first leg and the second leg in the opposite directions with respect to each other, it is possible to adjust an overlap angle at which switching elements of the first leg and second leg of the full bridge are brought into an ON state simultaneously, while preventing a change in a phase center of the overlap angle between the first leg and the second leg. The prevention of the change in the phase center of the overlap angle eliminates phase deviation away from a reference signal of the output voltage (first phase deviation) and phase deviation between different output voltages (second phase deviation).

Figure 6:
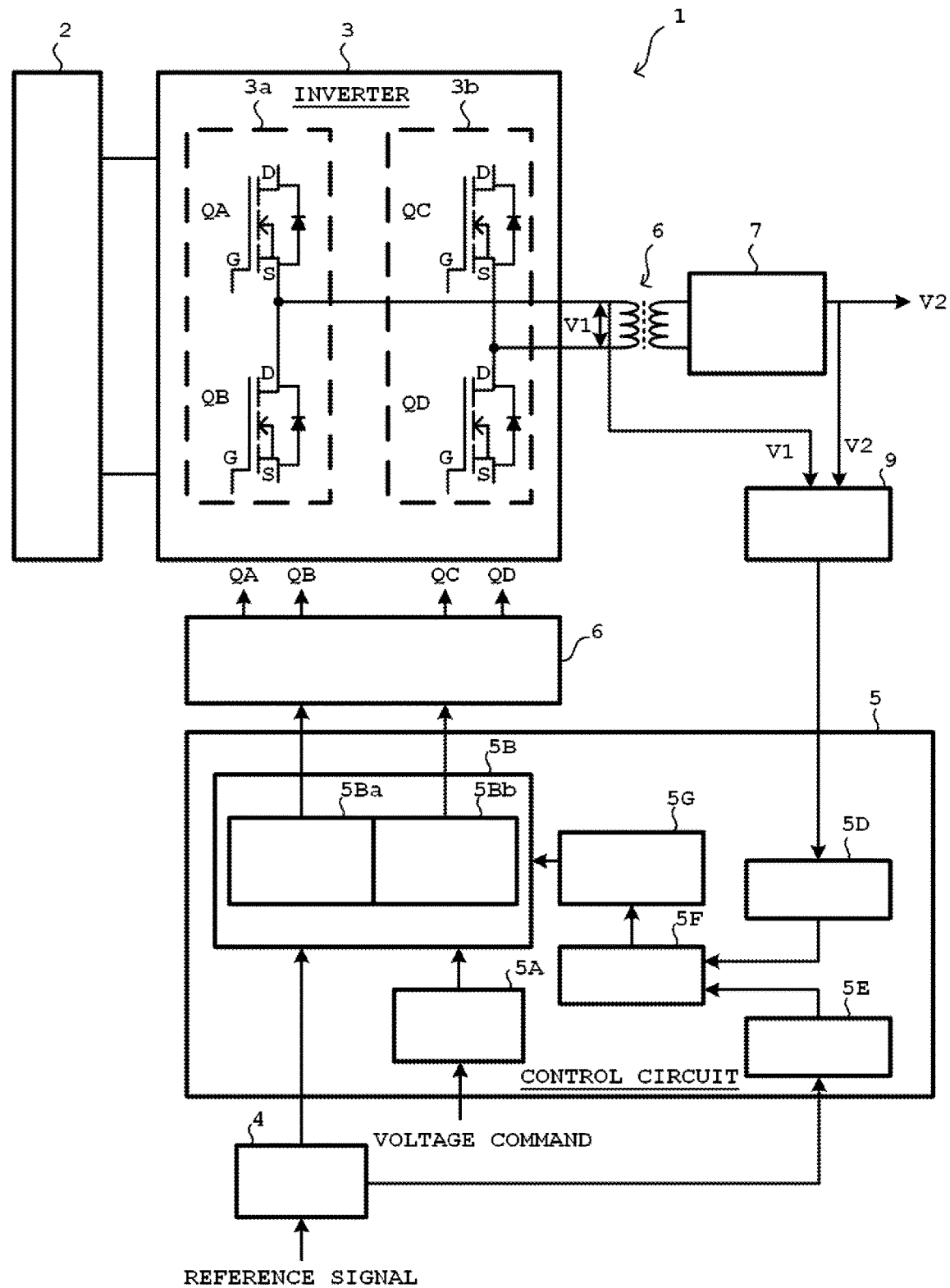
FIG. 6 illustrates a configuration example of phase compensation by the control circuit of the power conversion device according to the invention.
Figure 7:
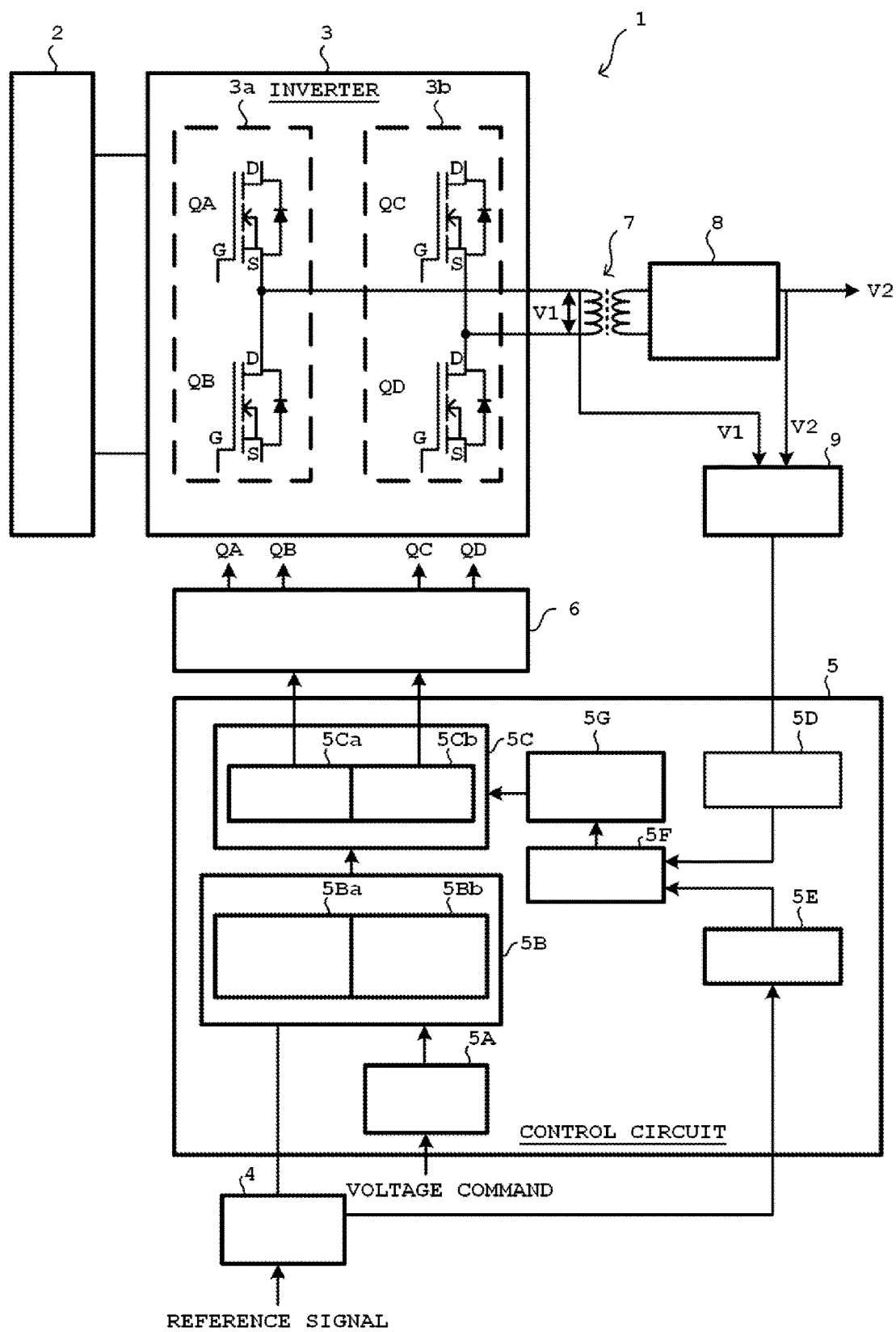
FIG. 7 illustrates another configuration example of the phase compensation by the control circuit of the power conversion device according to the invention.

A schematic configuration of the power conversion device of the invention will be described by referring to FIG. 1, configuration examples and operation examples of the phase shift by a control circuit provided to the power conversion device will be described by referring to FIGS. 2 to 5, configuration examples and an operation example of phase compensation by the control circuit of the power conversion device will be described by referring to FIGS. 6 to 8, and a configuration example of voltage compensation by the control circuit of the power conversion device will be described by referring to FIG. 9.

(Schematic Configuration of Power Conversion Device)

The schematic configuration of the power conversion device of the invention will be described with reference to FIG. 1.

A power conversion device 1 of the invention comprises an inverter 3 in a full bridge configuration, a control circuit 5 for controlling the inverter 3, and a drive circuit 6 for outputting a drive signal that drives switching elements QA to QD provided to the inverter 3.

The inverter 3 converts a DC voltage in a DC power source 2 into a rectangular wave AC output voltage V1. The rectangular wave AC output voltage V1 thus converted is sent via a transformer 7 to a filter circuit 8, and the filter circuit 8 then smooths the received voltage to output a sine wave AC output voltage V2.

(Inverter)

The invert 3 in the full bridge configuration has a first leg 3a in which two switching element QA and switching element QB are connected in series and a second leg 3b in which two switching element QC and switching element QD are connected in series, the first leg 3a and the second leg 3b being connected in parallel. One end of each of two parallel-connected legs, the first leg 3a and second leg 3b, is connected to a positive electrode of the DC power source 2, and the other end of each of the legs is connected to a negative electrode of the DC power source 2. A connection point P1 of an arm of the first leg 3a and a connection point P2 of an arm of the second leg 3b are used as output ends. The connection points P1, P2 as output ends are respectively connected to either end of an inductance of the transformer 7. The switching elements QA to QD may be FETs, by way of example.

In this context, the series-connected switching element QA and switching element QB form the first leg 3a and the series-connected switching element QC and switching element QD form the second leg 3b. However, since the first leg 3a and the second leg 3b are electric equivalent to each other, except that the current directions of the legs due to the switching operation are opposite to each other, these legs can be used in the same way even in a configuration in which a relationship between the first leg 3a and second leg 3b and the switching elements QA to QD is changed.

Figure 1:
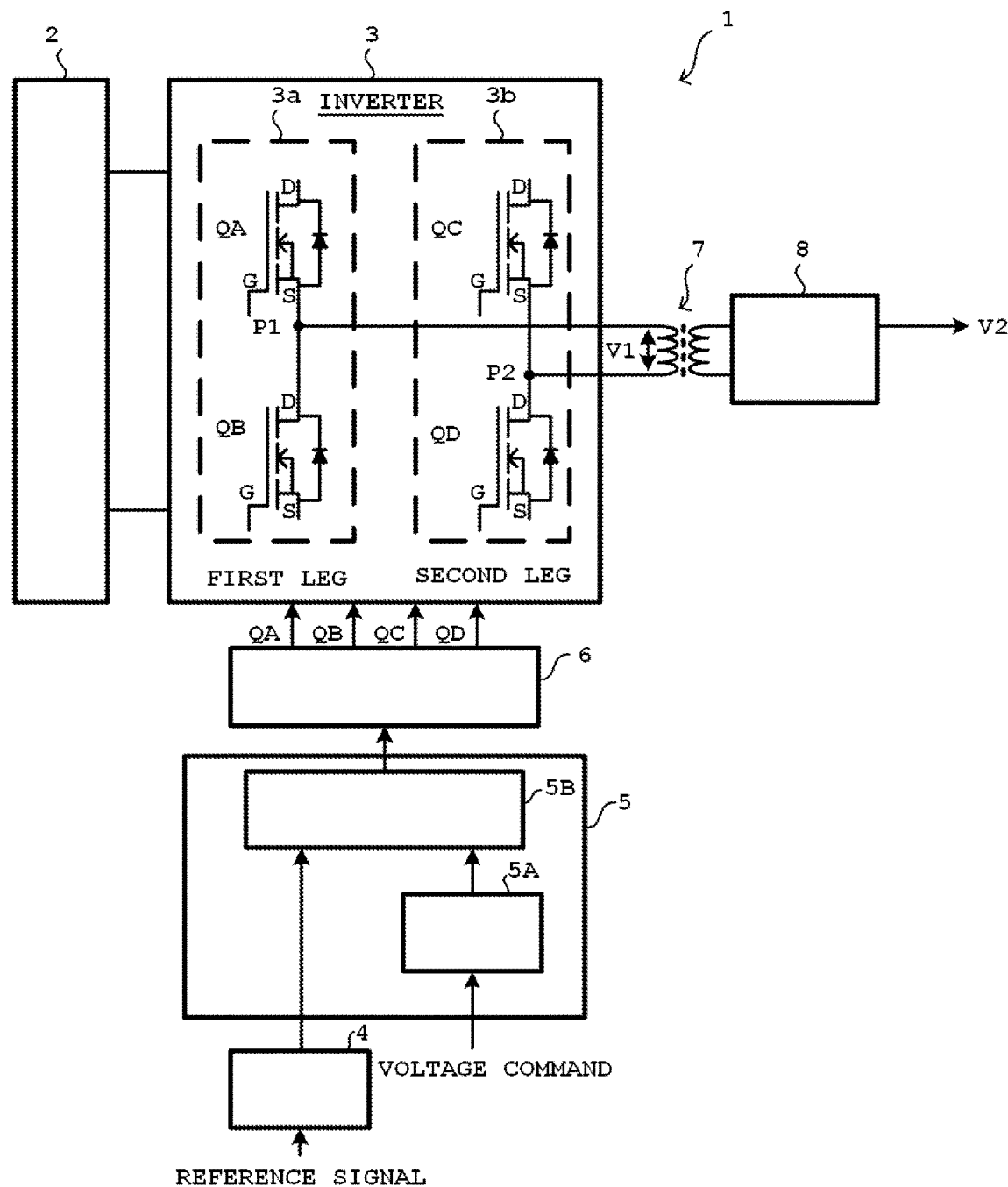
FIG. 1 illustrates a schematic configuration of a power conversion device according to the invention.

In the configuration shown in FIG. 1, a current flows from the connection point P1 to the connection point P2 in a period during which the switching element QA and the switching element QD are brought into an ON state simultaneously, and the current direction is reversed in a period during which the switching element QB and the switching element QC are brought into the ON state simultaneously, so that the current flows from the connection point P2 to the connection point P1. The change in the current direction allows the inverter 3 to output the rectangular wave AC output voltage V1.

(Control Circuit)

The control circuit 5 produces control signals for controlling ON/OFF operations of the switching elements of the first leg 3a and the second leg 3b. The drive circuit 6 produces drive signals in response to the control signal of the control circuit 5. To each gate terminal G of the switching elements QA, QB of the first leg 3a and the switching elements QC, QD of the second leg 3b, which constitute the inverter 3, the drive signals of the drive circuit 6 are input, and thereby the switching elements QA to QD perform the ON/OFF operation in response to the drive signals.

The control circuit 5 uses phase shift signals obtained by performing the phase shift on rectangular wave signals, in order to control the ON/OFF operation of the switching elements QA to QD of the first leg 3a and the second leg 3b in the full bridge configuration. The rectangular wave signals are composed of a pair of signals, each signal having a phase with opposite to each other in the same cycle, and has a certain phase relationship with a reference signal. A rectangular wave signal generating circuit 4 generates rectangular wave signals having the certain phase relationship with the reference signal.

FIG. 4(a) and FIG. 5(a) show examples of the reference signal. The illustrated reference signal is a signal with a rectangular wave, of which duty ratio including a dead time is 50% in the same cycle. However, since the reference signal defines the certain phase relationship with the rectangular wave signals, any signals that can define the phase relationship may be used, not exclusive to the signal having the rectangular wave which duty ratio including the dead time is 50% in the same cycle.

In FIG. 1, the control circuit 5 comprises a phase shift unit 5B that performs the phase shift on the rectangular wave signal to generate phase shift signals. The phase shift unit 5B performs the phase shift on a pair of rectangular wave signals having phases opposite to each other, which duty ratio including a dead time is 50% in the same cycle, respectively in the opposite directions with respect to each other by an amount of phase shift. This phase shift enables to generate a pair of rectangular wave signals with opposite phases that are phase shifted in one direction and another pair of rectangular wave signals with opposite phases that are phase shifted in the opposite direction. In this context, the phase shift in the opposite direction means the phase shift for advancing the phase and the phase shift for delaying the phase.

The pair of rectangular wave signals, which have the opposite phases that are phase shifted in one direction, control the ON/OFF operation of the switching elements of one of the legs, and the pair of rectangular wave signals, which have the opposite phases that are phase shifted in the opposite direction, control the ON/OFF operation of the switching elements of the other leg. For example, the pair of phase shift signals, which have the opposite phases that is phase shifted in one direction, allow the switching element QA on the positive electrode side and the switching element QB on the negative electrode side of the first leg 3a to turn ON and OFF with the phases opposite to each other.

On the other hand, the pair of phase shift signals, which have the opposite phases that are phase shifted in the direction opposite to the phase shift of the phase shift signals of the first leg 3a, allow the switching element QC on the positive electrode side and the switching element QD on the negative electrode side of the second leg 3b to turn ON and OFF with the phases opposite to each other.

The control of the amount of phase shift enables to control time widths of a period during which the switching element QA on the positive electrode side of the first leg 3a and the switching element QD on the negative electrode side of the second leg 3b are brought into the ON state simultaneously and a period during which the switching element QB on the negative electrode side of the first leg 3a and the switching element QC on the positive electrode side of the second leg 3b are brought into the ON state simultaneously.

An amplitude of the output voltage and output power are dependent on the time width of the period during which the switching elements of the first leg and the second leg, which are on the electrode sides opposite to each other, are brought into the ON state simultaneously. Thus, the control of increase and decrease in the amount of phase shift enables to control the amplitude of the output voltage and the output power.

The control circuit 5 comprises a phase shift amount generation unit 5A for generating an amount of phase shift in response to a voltage command, and a phase shift unit 5B for performing the phase shift on a pair of rectangular wave signals by the amount of phase shift.

The output voltage and the output power from the power conversion device performing the phase shift control are dependent on the amount of phase shift. Thus, a relationship between the output voltage or output power and the amount of phase shift is determined in advance, so that the phase shift amount generation unit 5A can generate the amount of phase shift in response to the voltage command or a power command based on this relationship. The configuration example in FIG. 1 shows that the amount of phase shift is generated based on the voltage command, but can be generated based on the power command. The phase shift unit 5B performs the phase shift on the pair of rectangular wave signals on the basis of the amount of phase shift generated by the phase shift amount generation unit 5A.

(Configuration Example of Phase Shift by Control Circuit)

Figure 2:
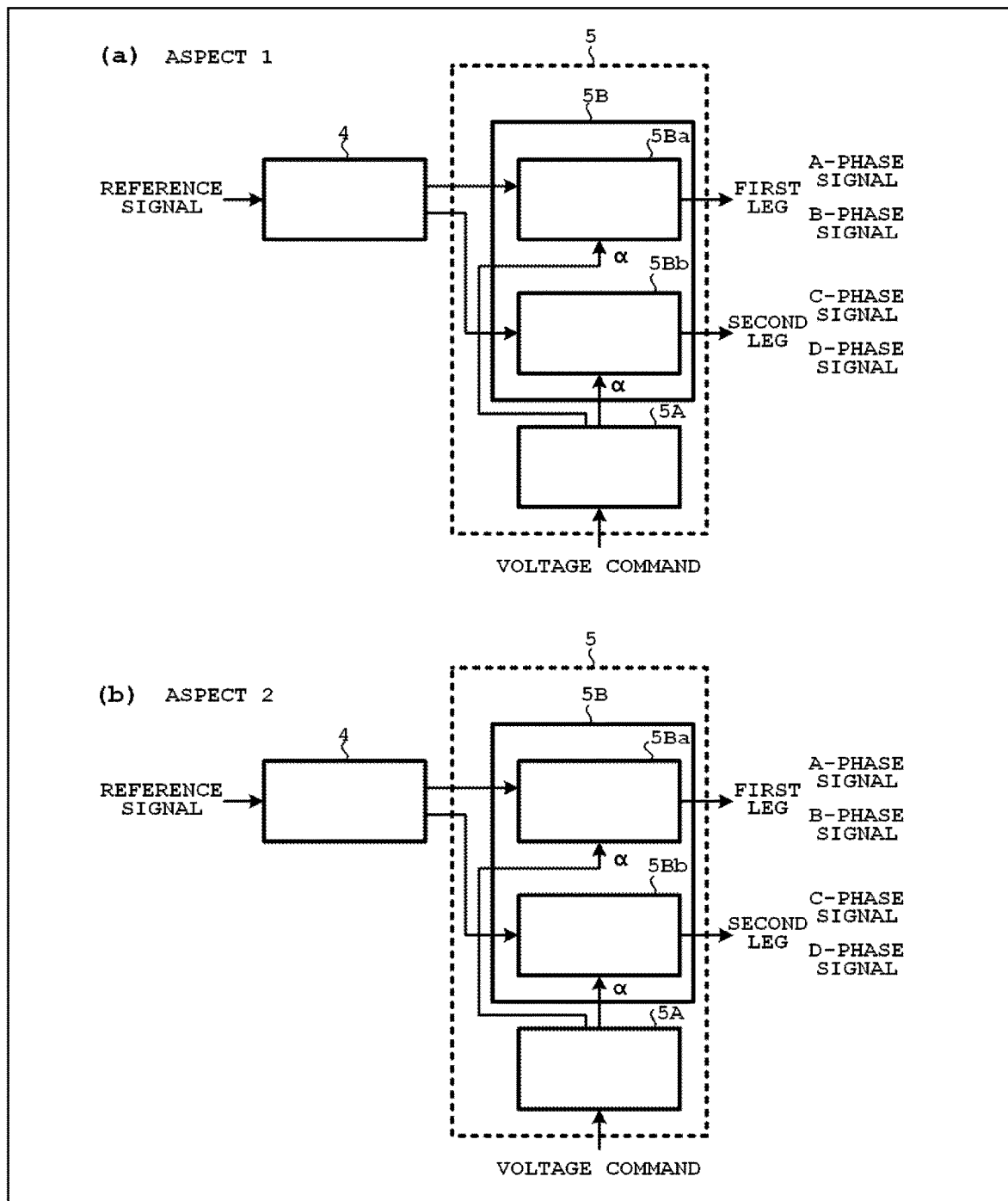
FIG. 2 illustrates a configuration example of a control circuit of the power conversion device according to the invention.
Figure 3:
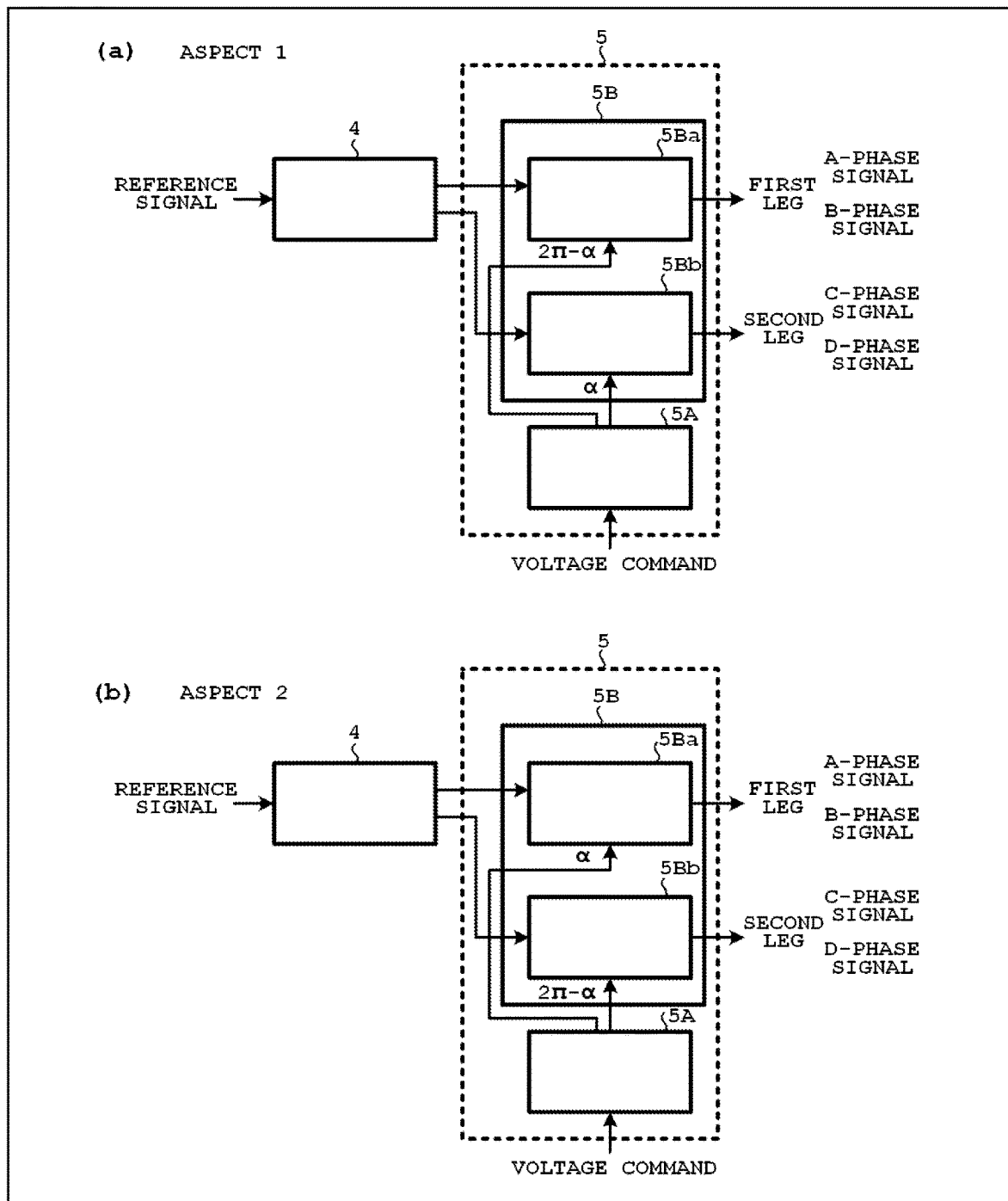
FIG. 3 illustrates another configuration example of the control circuit of the power conversion device according to the invention.

A description will now be made about a configuration example of the phase shift unit in the control circuit by referring to FIG. 2 for illustrating a first configuration example and FIG. 3 for illustrating a second configuration example.

(First Configuration Example)

The phase shift unit in the first configuration example advances a phase by leading-phase shift and delays the phase by lagging-phase shift in the phase shift in the opposite direction. In addition to that, the first configuration example has a first aspect and a second aspect, in which a phase shift unit for the leading-phase shift and a phase shift unit for the lagging-phase shift can be replaced with respect to the first leg and the second leg. FIG. 2(a) shows the first aspect, and FIG. 2(b) shows the second aspect. The first aspect and the second aspect differ from each other only in that the phase shift unit for the leading-phase shift and the phase shift unit for the lagging-phase shift are replaced each other, and therefore a description will be made mainly about the first aspect in here by referring to FIG. 2(a).

In FIG. 2(a), the phase shift unit 5B comprises, as a configuration for performing the phase shift based on the amount of phase shift generated by the phase shift amount generation unit 5A, a first phase shift section 5Ba and a second phase shift section 5Bb that perform the phase shift on a pair of rectangular wave signals by the amount of phase shift. The first phase shift section 5Ba and the second phase shift section 5Bb perform the phase shift on the pair of rectangular wave signals in the opposite directions with respect to each other. The first phase shift section 5Ba performs the leading-phase shift on the rectangular wave signal for advancing its phase by the amount of phase shift. By contrast, the second phase shift section 5Bb performs the lagging-phase shift on the rectangular wave signal for delaying its phase by the amount of phase shift. The phase shift unit 5B uses one of the phase shift sections to perform the leading-phase shift while using the other phase shift section to perform the lagging-phase shift, so as to perform phase shift in the opposite directions.

In FIG. 2(b), the first phase shift section 5Ba performs the lagging-phase shift on the rectangular wave signal for delaying its phase by the amount of phase shift, and the second phase shift section 5Bb performs the leading-phase shift on the rectangular wave signal for advancing its phase by the amount of phase shift.

Table 1 below presents Aspect 1 and Aspect 2 of the phase shift on the switching elements provided to the first leg and second leg in the first configuration example.

TABLE 1

|  | First Leg | | Second Leg | |
| --- | --- | --- | --- | --- |
|  | QA | QB | QC | QD |
| Aspect 1 | α Leading-Phase Shift | α Leading-Phase Shift | α Lagging-Phase Shift | α Lagging-Phase Shift |
| Aspect 2 | α Lagging-Phase Shift | α Lagging-Phase Shift | α Leading-Phase Shift | α Leading-Phase Shift |

(Second Configuration Example)

The phase shift unit in the second configuration example performs lagging-phase shift each time in the phase shift in the opposite directions to thereby advance the phase for one leg and delay the phase for the other leg.

Furthermore, the second configuration example can have a first aspect and a second aspect, in which the phase shift unit for the leading-phase shift and the phase shift unit for the lagging-phase shift can be replaced with respect to the first leg and the second leg. FIG. 3(a) shows the first aspect, and FIG. 3(b) shows the second aspect. The first aspect and the second aspect differ from each other only in that the phase shift unit for the leading-phase shift and the phase shift unit for the lagging-phase shift are replaced each other, and therefore a description will be made mainly about the first aspect in here by referring to FIG. 3(a).

In FIG. 3(a), the phase shift unit 5B comprises, as a configuration for performing the phase shift based on the amount of phase shift generated by the phase shift amount generation unit 5A, the first phase shift section 5Ba and the second phase shift section 5Bb that perform the phase shift on a pair of rectangular wave signals by the amounts of phase shift. The first phase shift section 5Ba and the second phase shift section 5Bb perform the phase shift on the pair of rectangular wave signals in the opposite directions with respect to each other. The first phase shift section 5Ba performs the lagging-phase shift on the rectangular wave signal for advancing its phase by the amount of phase shift. In order to advance the phase by an amount of phase shift α, the first phase shift section 5Ba performs lagging-phase shift by an amount of phase shift $(2\pi-\alpha)$.

By contrast, the second phase shift section 5Bb performs the lagging-phase shift on the rectangular wave signal for delaying its phase by the amount of phase shift. In order to delay the phase by the amount of phase shift α, the first phase shift section 5Ba performs the lagging-phase shift by the amount of phase shift $(2\pi-\alpha)$.

In the configuration of performing the lagging-phase shift by using both of the first phase shift section and second phase shift section, the phase shift unit 5B performs the phase shift in the opposite directions by making the phase shift section that performs the leading-phase shift to perform the lagging-phase shift by the amount of lagging-phase shift $(2\pi-\alpha)$ with respect to the amount of leading-phase shift α.

In FIG. 3(b), the first phase shift section 5Ba performs the lagging-phase shift on the rectangular wave signal to delay the phase by the amount of phase shift α, and the second phase shift section 5Bb performs the lagging phase shift on the rectangular wave signal to delay the phase by the amount of phase shift (2π-α), thereby performing the leading-phase shift of leading-phase shift α.

Table 1 below presents Aspect 1 and Aspect 2 of the phase shift on the switching elements provided to the first leg and the second leg in the second configuration example.

TABLE 2

|  | First Leg | | Second Leg | |
| --- | --- | --- | --- | --- |
|  | QA | QB | QC | QD |
| Aspect 1 | 2π-α Lagging-Phase Shift | 2π-α Lagging-Phase Shift | α Lagging-Phase Shift | α Lagging-Phase Shift |
| Aspect 2 | α Lagging-Phase Shift | α Lagging-Phase Shift | 2π-α Lagging-Phase Shift | 2π-α Lagging-Phase Shift |

(Operation Aspect of Phase Shift by Control Circuit)

Next, a description will be made about an operation aspect of the phase shift by the control circuit. A first operation aspect performs the leading-phase shift on the ON/OFF operation of the switching elements of the first leg, while performing the lagging-phase shift on the ON/OFF operation of the switching elements of the second leg. By contrast, the second operation aspect performs the lagging-phase shift on the ON/OFF operation of the switching elements of the first leg, while performing the leading-phase shift on the ON/OFF operation of the switching elements of the second leg.

(First Operation Aspect)

Figure 4:
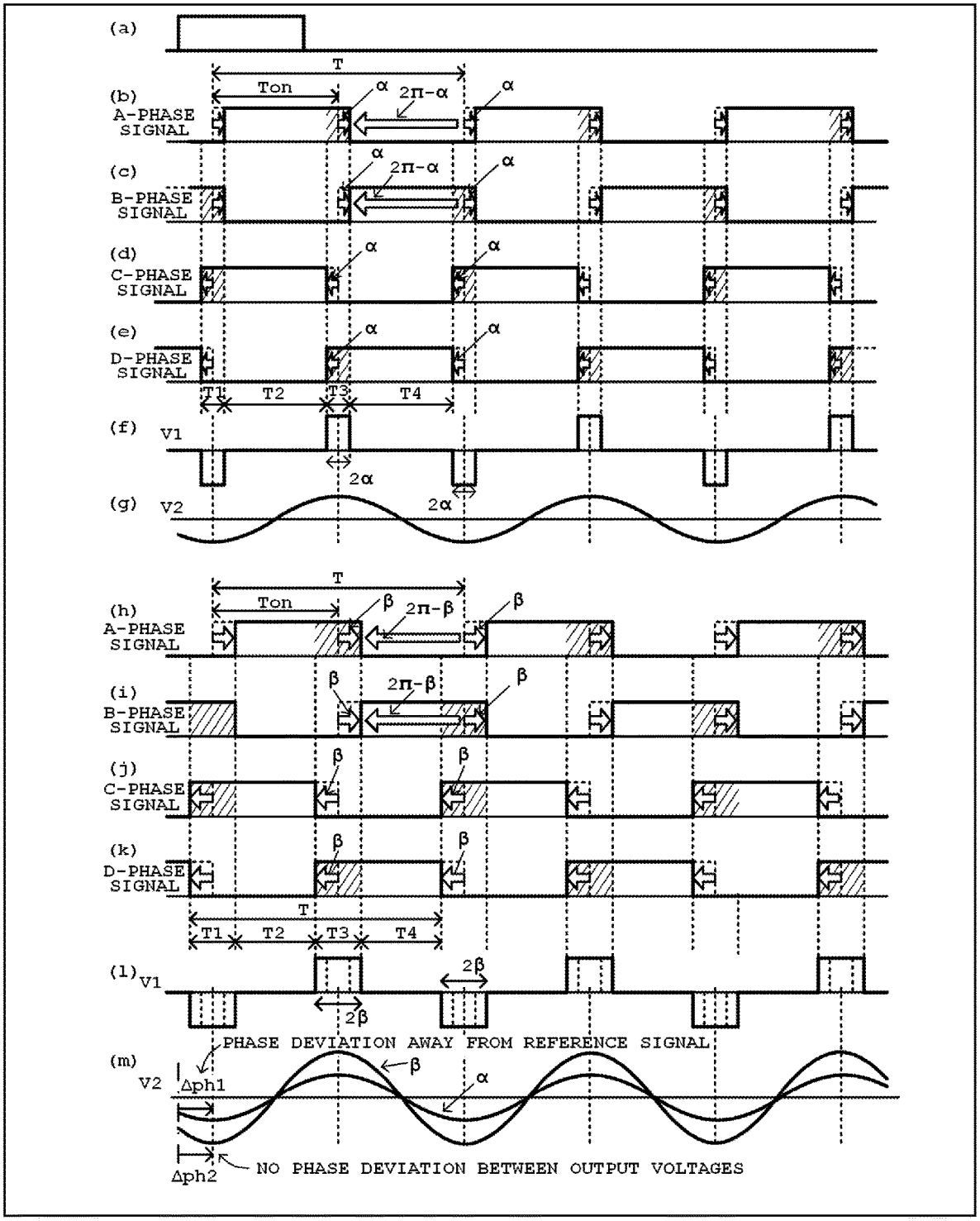
FIG. 4 illustrates an operation example of phase shift by the control circuit of the power conversion device according to the invention.

With reference to FIG. 4, a description will be made about the operation aspect of performing the leading-phase shift on the ON/OFF operation of the switching elements of the first leg and the lagging-phase shift on the ON/OFF operation of the switching elements of the second leg, in which the aspect uses phase signals (A-phase signal to D-phase signal) for driving the switching elements in the following description.

FIG. 4 shows examples of waveforms of phase-shifted full bridge signals of the present invention, in which the phase shift is performed on the A-phase signal and the B-phase signal of the first leg and the C-phase signal and the D-phase signal of the second leg in the opposite directions with respect to each other. FIG. 4 illustrates that both of the first leg consisting of the switching element QA and the switching element QB and the second leg consisting of the switching element QC and the switching element QD are used as shift legs, and the first leg is subjected to the leading-phase shift by the amount of phase shift, whereas the second leg is subjected to the lagging-phase shift by the amount of phase shift. FIGS. 4(b) to 4(g) show examples of the phase shift by the amount of phase shift α, and FIGS. 4(h) to 4(m) show examples of the phase shift by an amount of phase shift β.

In addition to that, FIG. 4(a) shows the reference signal, FIGS. 4(b), 4(c) and FIGS. 4(h), 4(i) show the A-phase signal and the B-phase signal for driving the switching elements QA and QB of the first leg, FIGS. 4(d), 4(e) and FIGS. 4(j), 4(k) show the C-phase signal and the D-phase signal for driving the switching elements QC and QD of the second leg, FIGS. 4(f) and 4(l) show the output voltage V1 of the switching circuit, and FIGS. 4(g) and 4(m) show the output voltage V2 of the filter circuit.

In the bridge circuit of the full bridge inverter, each of the A-phase signal, B-phase signal, C-phase signal and D-phase signal for driving the switching elements of the legs has a certain phase difference with respect to the reference signal, and each phase signal has the same cycle, in which a duty ratio between an ON signal and an OFF signal is 50%. In here, a dead time is omitted from the duty ratio.

The phases of the A-phase signal and the B-phase signal of the first leg are opposite to each other, and the phases of the C-phase signal and the D-phase signal of the second leg are opposite to each other. As to the phase signals before the phase shift, the A-phase signal and the C-phase signal have the same phases, and the B-phase signal and the D-phase signal have the same phases.

As to the phase signals during the phase shift, the A-phase signal and the B-phase signal of the first leg have leading phases or lagging phases, and the C-phase signal and the D-phase signal of the second leg have the lagging phases or leading phases in the direction opposite to the direction of the first leg. Since the directions of the A-phase signal and the B-phase signal of the first leg are opposite to the directions of the C-phase signal and the D-phase signal of the second leg, there are phase differences (2α or 2β) of twice the amount of phase shift (the amount of phase shift α or of phase shift between the A-phase signal and B-phase signal of the first leg and the C-phase signal and D-phase signal of the second leg during the phase shift.

In the following, examples of the phase shift by the amount of phase shift α will be described with reference to FIGS. 4(a) to 4(g). FIG. 4(a) shows the reference signal, and the A-phase signal and the B-phase signal respectively in FIGS. 4(b) and 4(c) are subjected to the leading-phase shift by the amount of phase shift α, whereas the C-phase signal and the D-phase signal respectively in FIGS. 4(d) and 4(e) are subjected to the lagging-phase shift by the amount of phase shift α.

Before performing the phase shift, there is no period during which the phase signals overlap one another because the A-phase signal and B-phase signal of the first leg as well as the D-phase signal and C-phase signal of the second leg have the phases opposite to one another. Thus, a current does not flow through the switching circuit, and consequently no output can be obtained.

In the phase shift in the opposite directions, the A-phase signal and the B-phase signal of the first leg have the leading phases, and the C-phase signal and the D-phase signal of the second leg have the lagging phases in the directions opposite to the directions of the first leg. The phase shift for the first leg and the phase shift for the second leg are performed in time directions opposite to one another by the same amount of phase shift α. By performing this phase shift, a time width T1 is generated for a period during which the B-phase signal of the first leg and the C-phase signal of the second leg overlap each other in a half cycle, thereby bringing the switching elements into the ON state simultaneously to form a current path between the electrodes of the DC power source via the switching circuit. Furthermore, in the next half cycle, a time width T3 is generated for a period during which the A-phase signal of the first leg and the D-phase signal of the second leg overlap each other, thereby changing the switching elements to be brought into the ON state to form a current path in the direction opposite to that of the current path in the previous half cycle.

Accordingly, the B-phase signal of the first leg and the C-phase signal of the second leg overlap each other in the time width T1 that corresponds to the amount 2α which is twice the amount of phase shift α, so as to generate the output voltage V1. Furthermore, the A-phase signal of the first leg and the D-phase signal of the second leg overlap each other in the time width T3 that corresponds to the amount 2α which is twice the amount of phase shift α, so as to generate the output voltage V1 of reverse polarity. By contrast, in a time width T2, both of the A-phase signal of the first leg and the C-phase signal of the second leg are in the ON state, while the B-phase signal of the first leg and the D-phase signal of the second leg are in the OFF state, so that output voltage is not generated. Similarly, in a time width T4, both of the A-phase signal of the first leg and the C-phase signal of the second leg are in the OFF state, while both of the B-phase signal of the first leg and the D-phase signal of the second leg is in the ON state, so that no current path is formed and the output voltage is not generated.

The output voltage V1 becomes, as shown in FIG. 4(f), a rectangular wave AC in a time width corresponding to the amount of phase shift 2α, which polarity alternates between positive and negative. The output voltage V2 will have a sine waveform by smoothing the output voltage V1 with the filter circuit, as shown in FIG. 4(g).

FIG. 4(m) shows the output voltages V2 that are subjected to the phase shift by the amount of phase shift α and the amount of phase shift β, respectively. The phase deviation away from the reference signal is eliminated in the output voltage V2 by the amount of phase shift α and the other output voltage V2 by the amount of phase shift β, and the phase deviation between the output voltages is also eliminated.

Since FIGS. 4(h) to 4(m) show the examples of the phase shift by the amount of phase shift β, which are different from the examples of the phase shift by the amount of phase shift α shown in FIGS. 4(b) to 4(g) only in the amounts of phase shift, the description about these examples will not be made here.

(Second Operation Aspect)

Figure 5:
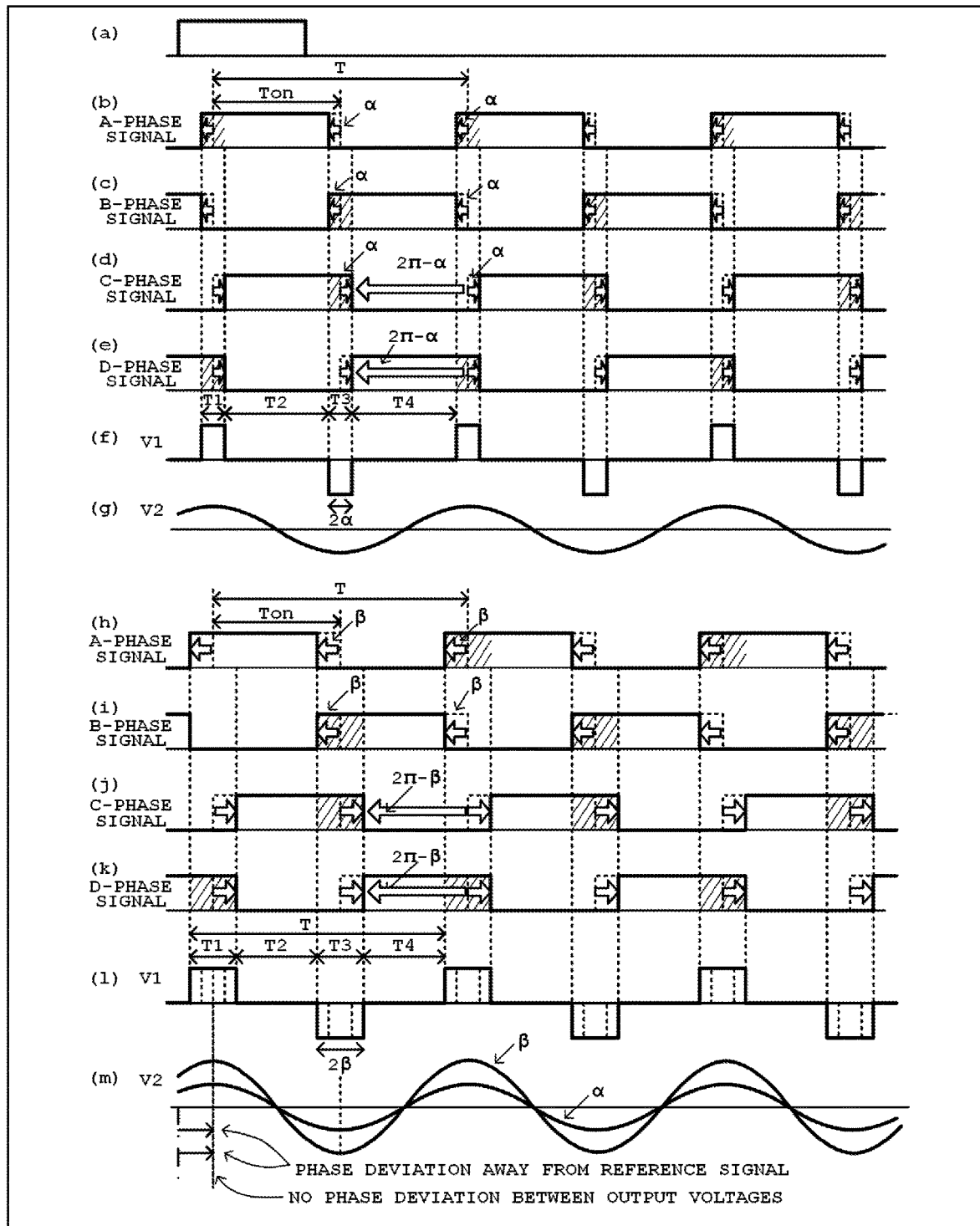
FIG. 5 illustrates an operation example of the phase shift by the control circuit of the power conversion device according to the invention.

With reference to FIG. 5, a description will be made about an operation aspect of performing the lagging-phase shift on the ON/OFF operation of the switching elements of the first leg, and the leading-phase shift on the ON/OFF operation of the switching elements of the second leg, in which the phase signals (A-phase signal to D-phase signal) for driving the switching elements are used.

FIG. 5 shows examples of waveforms of phase-shifted full bridge signals of the present invention, the A-phase signal and the B-phase signal of the first leg and the C-phase signal and the D-phase signal of the second leg being phase shifted in the directions opposite to one another. The figure shows that both of the first leg consisting of the switching element QA and the switching element QB and the second leg consisting of the switching element QC and the switching element QD are used as shift legs, and the first leg is subjected to the lagging-phase shift by the amount of phase shift, while the second leg is subjected to the leading-phase shift by the amount of phase shift. Furthermore, FIGS. 5(b) to 4(g) show the examples of the phase shift by the amount of phase shift α, and FIGS. 5(h) to 5(m) show the examples of the phase shift by the amount of phase shift β.

FIG. 5(a) also shows the reference signal, FIGS. 5(b), 5(c) and FIGS. 5(h), 5(i) show the A-phase signal and the B-phase signal for driving the switching elements QA and QB of the first leg, respectively, FIGS. 5(d), 5(e) and FIGS. 5(j), 5(k) show the C-phase signal and the D-phase signal for driving the switching elements QC and QD of the second leg, respectively, FIGS. 5(f) and 5(l) show the output voltage V1 of the switching circuit, and FIGS. 5(g) and 5(m) show the output voltage V2 of the filter circuit.

In the bridge circuit of the full bridge inverter, each of the A-phase signal, B-phase signal, C-phase signal and D-phase signal for driving the switching elements of the legs has a certain phase difference with respect to the reference signal, and each phase signal has the same cycle, in which a duty ratio between an ON signal and an OFF signal is 50%. In here, a dead time is omitted from the duty ratio.

The phases of the A-phase signal and the B-phase signal of the first leg are opposite to each other, and the phases of the C-phase signal and the D-phase signal of the second leg are opposite to each other. As to the phase signals before the phase shift, the A-phase signal and the C-phase signal have the same phases, and the B-phase signal and the D-phase signal have the same phases.

As to the phase signals during the phase shift, the A-phase signal and the B-phase signal of the first leg have the leading phase or lagging phase, and the C-phase signal and the D-phase signal of the second leg have the lagging phases or leading phases in the direction opposite to the direction of the first leg. Since the directions of the A-phase signal and the B-phase signal of the first leg are opposite to the directions of the C-phase signal and the D-phase signal of the second leg, there are phase differences (2α or 2β) of twice the amount of phase shift (the amount of phase shift α or of phase shift β) between the A-phase signal and B-phase signal of the first leg and the C-phase signal and D-phase signal of the second leg during the phase shift.

In the following, the examples of the phase shift by the amount of phase shift α will be described with reference to FIGS. 5(a) to 11(g). FIG. 5(a) shows the reference signal, and the A-phase signal and the B-phase signal respectively in FIGS. 5(b) and 5(c) are subjected to the lagging-phase shift by the amount of phase shift α, whereas the C-phase signal and the D-phase signal respectively in FIGS. 5(d) and 5(e) are subjected to the leading-phase shift by the amount of phase shift α.

Before performing the phase shift, there is no period during which the phase signals overlap one another because the A-phase signal and B-phase signal of the first leg as well as the D-phase signal and C-phase signal of the second leg have the phases opposite to one another. Thus, a current does not flow through the switching circuit, and consequently no output can be obtained.

In the phase shift in the opposite directions, the A-phase signal and the B-phase signal of the first leg have the lagging phases, and the C-phase signal and the D-phase signal of the second leg has the leading phases in the direction opposite to that of the first leg. The phase shift for the first leg and the phase shift for the second leg are performed in the time directions opposite to each other by the same amount of phase shift α. By performing this phase shift, the time width T3 is formed for the period during which the B-phase signal of the first leg and the C-phase signal of the second leg overlap each other in a half cycle, thereby bringing the switching elements into the ON state simultaneously to form the current path between the electrodes of the DC power source via the switching circuit. Furthermore, in the next half cycle, the time width T1 is formed for the period during which the A-phase signal of the first leg and the D-phase signal of the second leg overlap each other, thereby changing the switching elements to be brought into the ON state to form the current path in the direction opposite to that in the previous half cycle.

Accordingly, the A-phase signal of the first leg and the D-phase signal of the second leg overlap each other in the time width T1 that corresponds to the amount 2α which is twice the amount of phase shift α, so as to generate the output voltage V1. Furthermore, the B-phase signal of the first leg and the C-phase signal of the second leg overlap each other in the time width T3 that corresponds to the amount 2α which is twice the amount of phase shift α, so as to generate the output voltage V1 of reverse polarity. By contrast, in the time width T2, both of the A-phase signal of the first leg and the C-phase signal of the second leg are in the ON state, while the B-phase signal of the first leg and the D-phase signal of the second leg are in the OFF state, so that output voltage is not generated. Similarly, in the time width T4, both of the A-phase signal of the first leg and the C-phase signal of the second leg are in the OFF state, while both of the B-phase signal of the first leg and the D-phase signal of the second leg are in the ON state, so that the current path is not formed, and thereby output voltage is not generated.

The output voltage V1 becomes, as shown in FIG. 5(f), a rectangular wave AC in the time width corresponding to the amount of phase shift 2α, which polarity alternates between positive and negative. The output voltage V2 will have a sine waveform by smoothing the output voltage V1 with the filter circuit, as shown in FIG. 5(g).

FIG. 5(m) shows the output voltages V2 that are subjected to the phase shift by the amount of phase shift α and the amount of phase shift β, respectively. The phase deviation away from the reference signal is eliminated in the output voltage V2 by the amount of phase shift α and the other output voltage V2 by the amount of phase shift β, and the phase deviation between the output voltages is also eliminated.

FIGS. 5(h) to 5(m) show the examples of the phase shift by the amount of phase shift β, which are different from the examples of the phase shift by the amount of phase shift α shown in FIGS. 5(b) to 5(g) only in the amounts of phase shift, and thus the description about these examples will not be made.

(Configuration Example of Phase Compensation by Control Circuit)

The control circuit may comprise circuitry for performing the phase compensation on the phase deviation in the reference signal for the output voltage caused by a factor, such as circuit characteristics. As examples of circuitry for phase compensation, a first configuration example of performing the phase compensation by a phase shift unit and a second configuration of performing the phase compensation by a phase compensating unit will be described.

(First Configuration Example of Phase Compensation)

The first configuration example of the phase compensation will be described by referring to FIG. 6. The first configuration example of the phase compensation is adapted to perform the phase compensation by the phase shift unit. The control circuit 5 comprises a phase detecting unit 5D, another phase detecting unit 5E, a phase comparing unit 5F and a phase compensation amount calculating unit 5G, in addition to the phase shift amount generation unit 5A and the phase shift unit 5B shown in FIG. 1.

The phase detecting unit 5D detects a phase of an output voltage. As an output voltage, an output voltage V1 and an output voltage V2 detected by a voltage waveform detecting circuit 9 can be used. The phase detecting unit 5E detects a phase of a rectangular wave signal generated by the rectangular wave signal generating circuit 4. The phase comparing unit 5F compares the phase of the voltage detected by the phase detecting unit 5D with the phase of the rectangular wave signal detected by the phase detecting unit 5E. The phase compensation amount calculating unit 5G calculates an amount of phase compensation for compensating the phase of the output voltage to a phase of a reference signal based on a phase difference acquired by the phase comparison by the phase comparing unit 5F.

The phase shift unit 5B controls the amounts of phase shift of a first phase shift section 5Ba and/or a second phase shift section 5Bb based on the amount of phase compensation calculated by the phase compensation amount calculating unit 5G to thereby compensate phases of rectangular wave signals for a pair of the switching elements on the opposite electrode sides of the first leg and the second leg.

(Second Configuration Example of Phase Compensation)

The second configuration example of the phase compensation will be described by referring to FIG. 7. The second configuration example of the phase compensation comprises the phase compensating unit 5C for performing the phase compensation.

The control circuit 5 comprises the phase compensating unit 5C, the phase detecting unit 5D, the phase detecting unit 5E, the phase comparing unit 5F and the phase compensation amount calculating unit 5G, in addition to the phase shift amount generation unit 5A and the phase shift unit 5B shown in FIG. 1.

The phase compensating unit 5C compensates a phase of an output signal of the phase shift unit 5B. The phase detecting unit 5D detects a phase of an output voltage. As output voltages, the output voltage V1 and/or the output voltage V2 detected by the output voltage rectangular wave detecting circuit 9 can be used. The phase detecting unit 5E detects a phase of the rectangular wave signal generated by the rectangular wave signal generating circuit 4. The phase comparing unit 5F compares the phase of the voltage detected by the phase detecting unit 5D with the phase of the rectangular wave signal detected by the phase detecting unit 5E. The phase compensation amount calculating unit 5G calculates the amount of phase compensation for compensating the phase of the output voltage to the phase of the reference signal based on a phase difference acquired by the phase comparison by the phase comparing unit 5F.

The phase compensating unit 5C controls the phase of the output signal from the phase shift unit 5B based on the amount of phase compensation calculated by the phase compensation amount calculating unit 5G, thereby performing the phase compensation on phases of rectangular wave signals for a pair of the switching elements on the opposite electrode sides of the first leg and the second leg.

(Operation Example of Phase Compensation)

Figure 8:
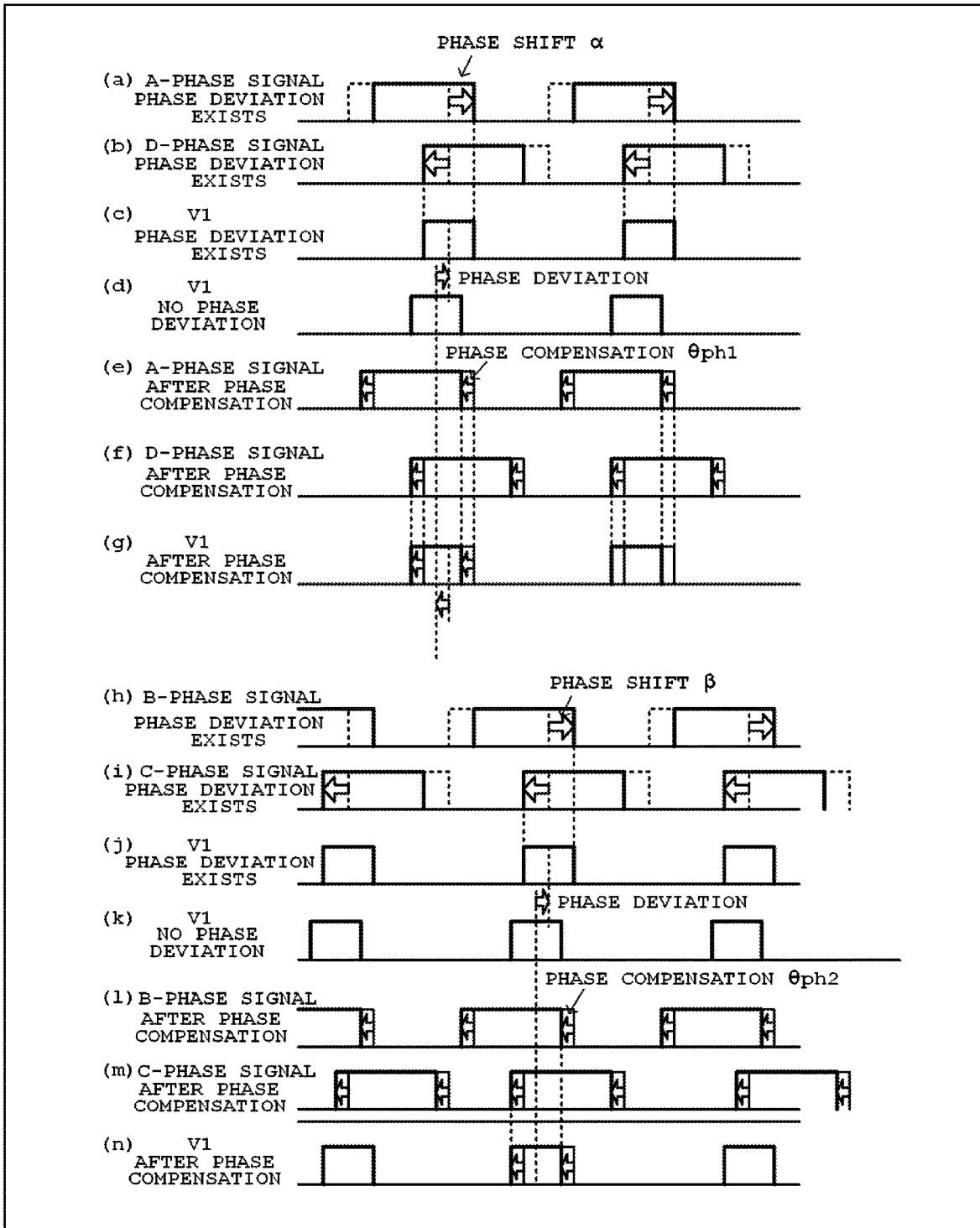
FIG. 8 illustrates an operation example of the phase compensation by the control circuit of the power conversion device according to the invention.
Figure 9:
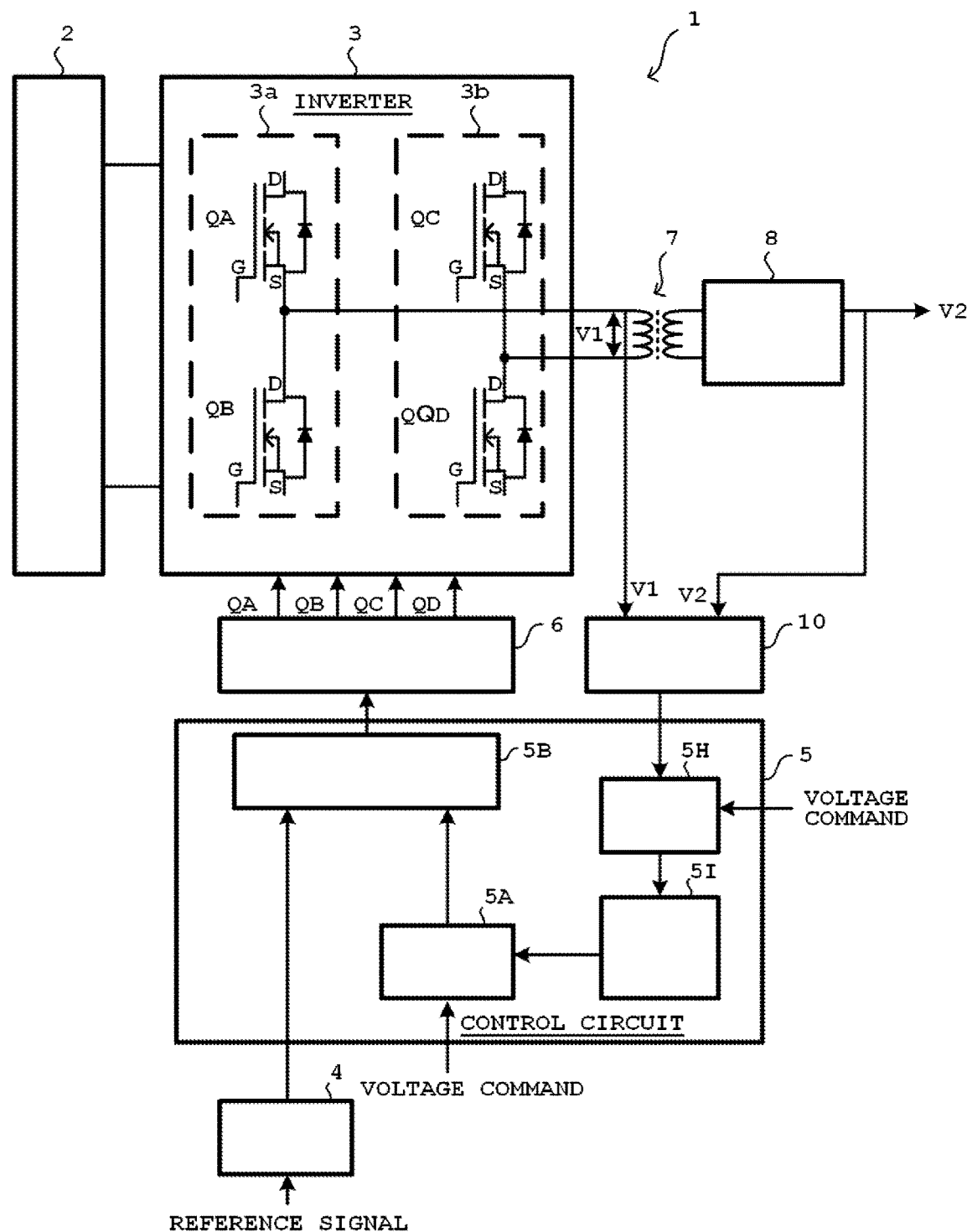
FIG. 9 illustrate a configuration example of voltage compensation by the control circuit of the power conversion device according to the invention.
Figure 10:
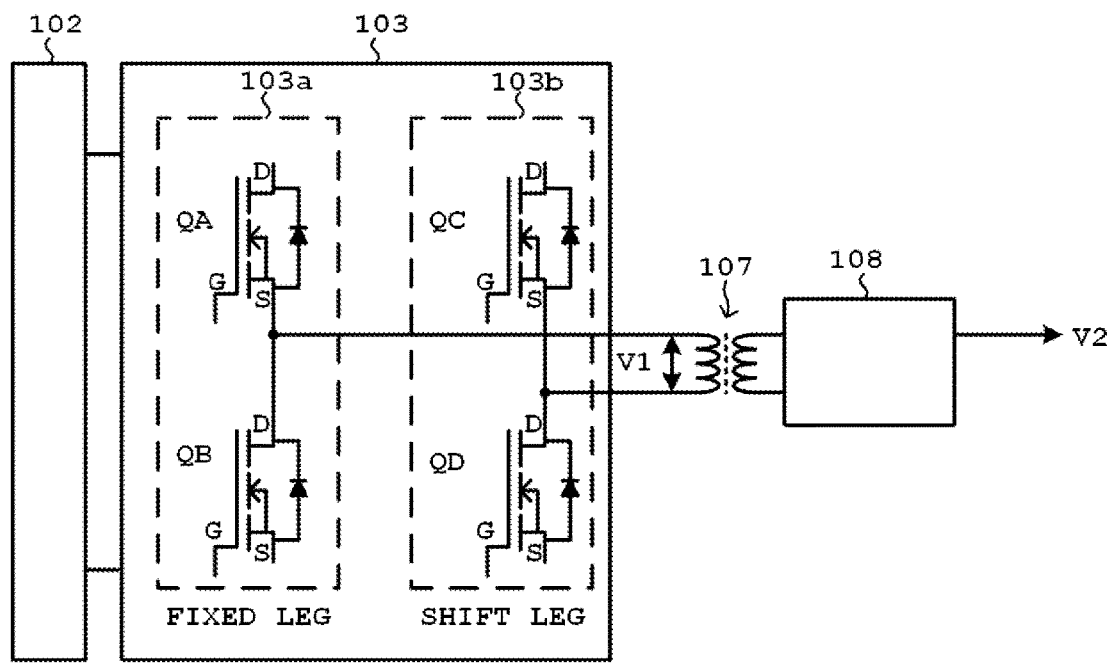
FIG. 10 shows a schematic configuration of a phase-shifted full bridge switching circuit.

With reference to FIG. 8, operation examples of the phase compensation will be described. As the operation examples of the phase compensation for the phase deviation in the phase signals, a description will be made about a first operation example for performing the phase compensation on the phase deviation in the A-phase signal and the D-phase signal, a second operation example for performing the phase compensation on the phase deviation in the B-phase signal and the C-phase signal, and third and fourth operation examples of the phase compensation respectively on the phase deviation in the A-phase signal and the D-phase signal and the phase deviation in the B-phase signal and the C-phase signal. FIGS. 8(a) to 8(g) show the first operation example that performs the phase compensation when the A-phase signal and the D-phase signal have the phase deviation, and FIGS. 8(h) to 8(n) show the second operation example that performs the phase compensation when the B-phase signal and the C-phase signal have the phase deviation.

(First Operation Example)

A description will be made about the operation examples of the phase compensation when the phase deviation occurs in the A-phase signal and the D-phase signal away from the reference signal, by referring to FIGS. 8(a) to 8(g).

FIGS. 8(a) and 8(b) show respective states of the A-phase signal and the D-phase signal having the phase deviation, which are subjected to the phase shift by the amount of phase shift α, and FIG. 8(c) shows the output voltage V1 that has the phase deviation. As to the output voltage V1 having the phase deviation, the phase deviation occurs in the output voltage comparing to the case where no phase deviation occurs in the output voltage V1 shown in FIG. 8(d).

The phase compensation is performed on the switching element QA and the switching element QD by an amount of phase shift θph1 with respect to the amount of phase shift α. FIGS. 8(e) and 8(f) show respective states of the compensated phases of the A-phase signal and the D-phase signal. This phase compensation enables to compensate the phase deviation in the output voltages V1 and V2. FIG. 8(gn) shows a state of the compensation on the phase deviation of the output voltage V1.

(Second Operation Example)

A description will be made about the operation examples of the phase compensation when the B-phase signal and the C-phase signal have the phase deviation with respect to the reference signal, by referring to FIGS. 8(h) to 8(n).

FIGS. 8(h) and 8(i) show respective states of the B-phase signal and the C-phase signal having the phase deviation, which are subjected to the phase shift by the amount of phase shift β, and FIG. 8(j) shows the output voltage V1 that has the phase deviation. As to the output voltage V1 having the phase deviation, the phase deviation occurs in the output voltage comparing to the case where no phase deviation occurs in the output voltage V1 shown in FIG. 8(k).

The phase compensation is performed on the switching element QB and the switching element QC by an amount of phase shift θph2 with respect to the amount of phase shift β. FIGS. 8(l) and 8(m) show respective states in which the phases of the B-phase signal and the C-phase signal are compensated. This phase compensation enables to compensate the phase deviation in the output voltages V1 and V2. FIG. 8(n) shows a state of the compensation on the phase deviation of the output voltage V1.

(Third Operation Example)

The third operation example adopts a combination of the first operation example and the second operation example into a case where the A-phase signal and the D-phase signal have the phase deviation of the amount of phase shift α with respect to the reference signal and the B-phase signal and the C-phase signal have the phase deviation of the amount of phase shift β with respect to the reference signal. The phase compensation is performed on the switching element QA and the switching element QD by the amount of phase shift θph1 with respect to the amount of phase shift α, and on the switching element QB and the switching element QC by the amount of phase shift θph2 with respect to the amount of phase shift β.

(Fourth Operation Example)

The Fourth operation example adopts a combination of the first operation example and the second operation example into a case where the amount of phase shift for the A-phase signal and the D-phase signal and the amount of phase shift for the B-phase signal and the C-phase signal are the same amount of phase shift γ with respect to the reference signal. The phase compensation is performed on the switching elements QA to QD by an amount of phase shift θph3 with respect to the amount of phase shift γ to thereby compensate the phase deviation in the output voltage V2.

The following Table 3 presents the amount of phase shift θph for the phase compensation.

Aspect 1 shows the amount of phase shift θph1 for the phase compensation in the first operation example that performs the phase compensation on the switching element QA of the first leg and the switching element QD of the second leg by the amount of phase shift θph1.

Aspect 2 shows the amount of phase shift θph2 for the phase compensation in the second operation example that performs the phase compensation on the switching element QB of the first leg and the switching element QC of the second leg by the amount of phase shift θph2.

Aspect 3 shows the amounts of phase shift θph1 and θph2 for the phase compensation in the third operation example that performs the phase compensation on the switching element QA of the first leg and the switching element QD of the second leg by the amount of phase shift θph1, and on the switching element QB of the first leg and the switching element QC of the second leg by the amount of phase shift θph2.

Aspect 4 shows the amount of phase shift θph3 for the phase compensation in the fourth operation example that performs the phase compensation on the switching element QA of the first leg and the switching element QD of the second leg, as well as the switching element QB of the first leg and the switching element QC of the second leg by the amount of phase shift θph3.

TABLE 3

| | First Leg | | Second Leg | |
| --- | --- | --- | --- | --- |
| | QA | QB | QC | QD |
| Aspect 1 | θph1 Phase Compensation | | | θph1 Phase Compensation |
| Aspect 2 | | θph2 Phase Compensation | θph2 Phase Compensation | |
| Aspect 3 | θph1 Phase Compensation | θph2 Phase Compensation | θph1 Phase Compensation | θph2 Phase Compensation |
| Aspect 4 | θph3 Phase Compensation | θph3 Phase Compensation | θph3 Phase Compensation | θph3 Phase Compensation |

<Configuration Example of Voltage Compensation by Control Circuit>

The control circuit may comprise circuitry for performing voltage compensation on an output voltage affected by a factor, such as circuit characteristics.

(Configuration Example of Voltage Compensation)

A configuration example of the voltage compensation will be described with reference to FIG. 9. The configuration example of the voltage compensation controls the amount of phase shift in the phase shift amount generation unit 5A included in the control circuit 5.

The control circuit 5 comprises a voltage comparing unit 5H and a voltage compensation amount calculating unit 5I, in addition to the phase shift amount generation unit 5A and the phase shift unit 5B shown in FIG. 1.

The voltage comparing unit 5H compares an output voltage with a voltage command. As the output voltages, the output voltage V1 and/or output voltage V2 detected by the voltage detecting circuit 10 can be used. The voltage compensation amount calculating unit 5I calculates an amount of voltage compensation based on the comparison result by the voltage comparing unit 5H. The phase shift amount generation unit 5A compensates the amount of phase shift on the basis of the amount of voltage compensation calculated by the voltage compensation amount calculating unit 5I.

The phase shift unit 5B compensates the amount of phase shift for rectangular wave signals for a pair of the switching elements of the first leg and the second leg on the electrode sides opposite to each other, based on the amount of voltage compensation obtained by the voltage compensation amount calculating unit 5I.

The voltage compensation has an aspect of performing the compensation on both of the first leg and the second leg by the same amount of phase shift in the same direction, or another aspect of performing the compensation on two pairs of switching elements of the first leg and the second leg on the electrode sides opposite to one another in the directions opposite to each other by the same amount of phase shift in the same direction.

Table 4 below presents an amount of phase shift θv for the voltage compensation.

TABLE 4

|  | First Leg | | Second Leg | |
| --- | --- | --- | --- | --- |
|  | QA | QB | QC | QD |
| Aspect 1 | θv1 | θv1 | θv1 | θv1 |
| Aspect 2 | θv1 | θv2 | θv2 | θv1 |

In Aspect 1, the voltage compensation is performed by deviation the phases of the switching elements QA, QB of the first leg and the switching elements QC, QD of the second leg by an amount of phase shift θv1, thereby adjusting a time width of an overlap portion. According to Aspect 1, the output voltages in all cycles can be adjusted.

In Aspect 2, the voltage compensation is performed by deviation the phases of the switching element QA of the first leg and the switching element QD of the second leg by the amount of phase shift θv1, while deviation the phases of the switching element QB of the first leg and the switching element QC of the second leg by an amount of phase shift θv2, thereby adjusting a time width of an overlap portion in each half cycle. According to Aspect 1, the output voltage in every half cycle can be adjusted.

The above embodiments and modifications are a few examples of the power conversion device of the present invention, and thus the present invention is not limited to these embodiments. Accordingly, the present invention can be modified in various ways based on the gist of the invention, which modifications are not excluded from the scope of the present invention.

INDUSTRIAL APPLICABILITY

The power conversion device of the present invention can be applied to supply high-frequency power to devices that use high frequencies, such as manufacturing equipment for a semiconductor, liquid crystal panel and others, a vacuum deposition apparatus, and a heat-fusion apparatus.

REFERENCE SIGNS LIST

1 Power Conversion Device
2 DC Power Source
3 Inverter
3a First Leg
3b Second Leg
4 Rectangular Wave Signal Generating Circuit
5 Control Circuit
5A Phase Shift Amount Generation Unit
5B Phase Shift Unit
5Ba Phase Shift Section
5Bb Phase Shift Section
5C Phase Compensating Unit
5D Phase Detecting Unit
5E Phase Detecting Unit
5F Phase Comparing Unit
5G Phase Compensation Amount Calculating Unit
5H Voltage Comparing Unit
5I Voltage Compensation Amount Calculating Unit
6 Drive Circuit
7 Transformer
8 Filter Circuit
9 Output Voltage Waveform Detecting Circuit
10 Voltage Detecting Circuit
102 DC power source
103 Full Bridge Switching Circuit
103a First Leg
103b Second Leg
107 Transformer
108 Filter Circuit
G Gate terminal
P1 Connection Point
P2 Connection Point
QA Switching Element
QA-QD Switching Element
T1 Time Width
T2 Time Width
T3 Time Width
T4 Time Width
V1 Output Voltage
V2 Output Voltage
Δph Difference
Δph1 Amount of Phase Shift
Δph2 Amount of Phase Shift
a Amount of Phase Shift
b Amount of Phase Shift

The invention claimed is:

1. A power conversion device, comprising:
an inverter in a full bridge configuration, in which
two legs, or a first leg and a second leg having two switching elements, which are connected in series, are connected in parallel,
one end of each of the parallel-connected two legs is connected to a positive electrode of a DC power source, and the other end of each of the legs is connected to a negative electrode of the DC power source, and
a connection point of an arm of the first leg and a connection point of an arm of the second leg are used as output ends; and
a control circuit that controls an ON/OFF operation of the switching elements of the first and second legs, wherein
the control circuit is for:
performing phase shift on a pair of rectangular wave signals having phases opposite to each other in the same cycle by an amount of phase shift in opposite directions,
using a pair of phase shift signals having opposite phases, which are phase shifted in the same direction, to turn ON/OFF a switching element of the first leg on a positive electrode side and a switching element of the first leg on a negative electrode side in opposite phases, using a pair of phase shift signals having opposite phases, which are phase shifted in a direction opposite to the direction of the phase shift on the phase shift signal for the first leg, to turn ON/OFF a switching element of the second leg on a positive electrode side and a switching element of the second leg on a negative electrode side in opposite phases; and controlling a time width of a period during which both of the switching element of the first leg on the positive electrode side and the switching element of the second leg on the negative electrode side are turned ON by the amount of phase shift, and a time width of a period during which both of the switching element (QB) of the first leg on the negative electrode side and the switching element of the second leg on the positive electrode side are turned ON by the amount of phase shift.

2. The power conversion device according to claim 1, wherein the control circuit comprises:
a phase shift amount generation unit that generates the amount of phase shift on a basis of a voltage command; and
a phase shift unit that performs the phase shift on the pair of rectangular wave signals by the amount of phase shift,
the phase shift unit comprises a first phase shift section and a second phase shift section for performing on the pair of rectangular wave signals by the amount of phase shift,
the first phase shift section and the second phase shift section performing the phase shift on the pair of rectangular wave signals in directions opposite.

3. The power conversion device according to claim 2, wherein the first phase shift section and the second phase shift section perform the phase shift on the rectangular wave signals in the opposite directions by performing leading-phase shift for advancing the phase of the rectangular wave signal by the amount of phase shift, while performing lagging-phase shift for delaying the phase of the rectangular wave signal by the amount of phase shift.

4. The power conversion device according to claim 3, wherein the leading-phase shift delays the phase of the rectangular wave signal by an amount of phase shift defined by subtracting the amount of phase shift from $2\pi$.

5. The power conversion device according to claim 1, wherein the control circuit comprises:
a phase comparing unit that compares a phase difference between a reference signal and an output voltage; and
a phase compensation amount calculating unit that calculates an amount of phase compensation for compensating a phase of the output voltage to a phase of the reference signal on a basis of the phase difference,
the phase shift unit performs phase compensation on phases of rectangular wave signals for a pair of the switching elements of the first leg and the second leg which are on the opposite electrode sides on a basis of the amount of phase compensation.

6. The power conversion device according to claim 1, wherein the control circuit comprises:
a voltage comparing unit that compares voltage difference between the voltage command and the output voltage; and
a voltage compensation amount calculating unit that calculates an amount of voltage compensation for compensating the output voltage to the voltage command on a basis of the voltage difference,
the phase shift unit (5B) compensates an amount of phase shift for the rectangular signals for the pair of the switching elements of the first leg and the second leg which are on the opposite electrode sides on a basis of the amount of voltage compensation.

* * * * *